(12) United States Patent
Boucadair et al.

(10) Patent No.: US 10,834,680 B2
(45) Date of Patent: Nov. 10, 2020

(54) METHOD FOR CONTROLLING A RADIO SIGNAL EMITTED BY A GATEWAY, AND CORRESPONDING GATEWAY AND COMPUTER PROGRAM

(71) Applicant: ORANGE, Paris (FR)

(72) Inventors: Mohamed Boucadair, Chatillon (FR); Christian Jacquenet, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/469,983

(22) PCT Filed: Dec. 15, 2017

(86) PCT No.: PCT/FR2017/053617
§ 371 (c)(1),
(2) Date: Jun. 14, 2019

(87) PCT Pub. No.: WO2018/109419
PCT Pub. Date: Jun. 21, 2018

(65) Prior Publication Data
US 2020/0092729 A1 Mar. 19, 2020

(30) Foreign Application Priority Data
Dec. 15, 2016 (FR) ...................................... 16 62475

(51) Int. Cl.
*H04W 52/14* (2009.01)
*H04W 4/70* (2018.01)
(Continued)

(52) U.S. Cl.
CPC ......... *H04W 52/143* (2013.01); *H04W 4/023* (2013.01); *H04W 4/70* (2018.02);
(Continued)

(58) Field of Classification Search
CPC ..... H04W 4/023; H04W 4/029; H04W 12/08; H04W 88/16; H04W 88/08; H04W 48/04; H04W 12/12; H04W 4/33; H04W 52/143
See application file for complete search history.

(56) References Cited

U.S. PATENT DOCUMENTS 8,792,419 B2 * 7/2014 Wohlert .............. H04L 65/1016
370/328
2006/0293064 A1 * 12/2006 Robertson ........... H04W 64/006
455/456.1
(Continued)

FOREIGN PATENT DOCUMENTS

WO 2011124810 A1 10/2011

OTHER PUBLICATIONS

International Search Report dated Mar. 15, 2018 for corresponding International Application No. PCT/FR2017/053617, filed Dec. 15, 2017.
Written Opinion of the International Searching Authority dated Mar. 15, 2018 for corresponding International Application No. PCT/FR2017/053617, filed Dec. 15, 2017.
(Continued)

*Primary Examiner* — Keith Ferguson
(74) *Attorney, Agent, or Firm* — David D. Brush; Westman, Champlin & Koehler, P.A.

(57) ABSTRACT

A method for controlling a radio signal emitted by a device, so as to adapt the range thereof. The method includes: determining, by a controller, a level of radio signal emitted by the device on the edge of a deter mined zone; controlling, by the controller, an adaptation of the range of the radio signal emitted by the device according to the comparison of the signal level and a determined threshold.

14 Claims, 2 Drawing Sheets

(51) Int. Cl.
*H04W 4/02* (2018.01)
*H04W 48/04* (2009.01)
*H04W 12/00* (2009.01)
*H04W 12/02* (2009.01)
*H04W 88/16* (2009.01)

(52) U.S. Cl.
CPC ......... *H04W 12/001* (2019.01); *H04W 12/02* (2013.01); *H04W 48/04* (2013.01); *H04W 88/16* (2013.01)

(56) References Cited

U.S. PATENT DOCUMENTS

2009/0286496 A1 11/2009 Yavuz et al.
2015/0127646 A1* 5/2015 Shaw .................... G06F 16/254
707/737
2015/0271764 A1 9/2015 Agrawal et al.

OTHER PUBLICATIONS

Timothy J. Seppala, "Hackers Hijack Philips Hue Lights with a Drone", dated Mar. 11, 2016, found at https://www.engadget.com/2016/11/03/hackers-hijack-a-philips-hue-lights-with-a-drone/.
John Markoff, "Why Light Bulbs May be the Next Hacker Target", dated Nov. 3, 2016, found at http://www.nytimes.com/2016/11/03/technology/why-light-bulbs-may-be-the-next-hacker-target.html?_r=0.
Bruce Schneier, "The Internet if Things is Wildly Insecure—and Often Unpatchable", dated Jan. 6, 2014, found at https://www.schneier.com/essays/archives/2014/01/the_intemet_of thin.html.
Lecture: Too Many Cooks—Exploiting the Internet of TR-069 Things, dated Dec. 28, 2014, found at https://events.ccc.de/congress/2014/Fahrplan/events/6166.html.
English translation of the Written Opinion of the International Searching Authority dated Jun. 18, 2019 for corresponding International Application No. PCT/FR2017/053617 filed Dec. 15, 2017.

* cited by examiner

METHOD FOR CONTROLLING A RADIO SIGNAL EMITTED BY A GATEWAY, AND CORRESPONDING GATEWAY AND COMPUTER PROGRAM

CROSS-REFERENCE TO RELATED APPLICATIONS

This Application is a Section 371 National Stage Application of International Application No. PCT/FR2017/053617, filed Dec. 15, 2017, which is incorporated by reference in its entirety and published as WO 2018/109419 A1 on Jun. 21, 2018, not in English.

FIELD OF THE INVENTION

The field of the invention is that of telecommunications and more particularly that of adapting the range of the radio signal emitted by a residential gateway or by connected things (context of services deployed on Internet of Things).

The invention is therefore applicable in any communication network implementing at least one residential gateway (domestic or enterprise) having one or more radio components capable of transmitting and receiving waves of various kinds: Wi-Fi, Bluetooth, NFC (Near Field Communication), 4G (3GPP LTE version 13 and above), LoRa® WAN (Long Range Wide-area Network)), etc.).

PRIOR ART

The IP ("Internet Protocol") network is the universal medium for a multitude of services and applications.

To access these services or applications, a residential gateway, also called "box", HG for "Home Gateway" or CPE for "Customer Premises Equipment", is conventionally installed in the home of a user. In other words, a residential gateway serves as interface between the local area network of the user and the IP network of an operator. It is therefore the hub element through which passes all of the connections, the traffic characteristic of the different services subscribed to by the client, and which also supports a set of applications provided by a telecommunications operator.

For example, a residential gateway allows a user to access multiple IP services simultaneously allowing access to the Internet, to video contents (including broadcast television programs) and to voice services (telephony over IP, for example). The corresponding commercial offering is conventionally called Triple Play and, more broadly, Multi-play.

In terms of connectivity, the residential gateway is connected on one side to the network of the operator and provides, on the client side, a varied set of interfaces: wireless interfaces (e.g. WLAN, Bluetooth (registered trademark), etc.), RJ11 socket for telephony, RJ45 sockets for digital television and computers, USB (Universal Serial Bus) sockets, Ethernet ports.

In addition to providing access to all of the services (data, video, voice) subscribed to by the client, the residential gateway is also involved in the management of the functions that it supports (for example management of the NAT (Network Address Translator) address translation rules, of the firewall filters, etc.).

In terms of applications, the residential gateway incorporates the software used for the gateway maintenance operations.

A user wanting to access the Internet from a terminal, does so very often by using wireless communication, generally of IEEE 802.11 type, called Wi-Fi (registered trademark), set up between his or her terminal and his or her residential gateway.

Such a gateway comprises an administration interface, generally accessible by the HTTP (HyperText Transfer Protocol) protocol but this interface is largely unknown to most of the users.

The emergence of services relying on the Internet of things (IoT) by its nature causes significant security failings. In particular, the set of services relying on the operation of networked connected things (network of motion detection and smoke detection sensors, network of sensors intended to control the lighting of a residence, remote medicine services relying on sensors intended to permanently monitor a set of biometric data, etc.) inevitably raises the question of personal data protection but also of the sending of instructions which can disrupt the operation of these things in their nominal environment.

In effect, the great majority of the connected things have radio transmission and reception components embedded in them which allow them to process the commands originating from a controller (for example, a Smartphone, a local console, etc.) connected somewhere to the Internet or within the service zone delimited by the range of the radio signal emitted by the gateway. The radio components are also used by these connected things to transmit to a controller, either regularly (for example, monthly collection from the electricity meter), or spontaneously (for example, sending of a notification to a controller when a biometric data threshold is on the point of being exceeded), all of the data that they have collected. Thus, these components are used to receive instructions from a controller such as instructions to switch on, switch to standby, etc.

In this respect, it is vitally important to preserve the confidentiality of the data transmitted or received by these connected things located within a service zone. Also, it is vitally important to ensure in particular that the radio transmissions do not constitute an attack vector liable to provoke the theft of these data, to compromise the integrity of these data by malicious users or to fraudulently command a connected thing to execute actions of a nature contradictory to its nominal operation and that can compromise the correct operation of the service provided by the thing.

One emblematic (and proven) risk of such security failings is that linked to the presence of a person having a smartphone embedding a "controller" function capable of controlling connected things in proximity to a residence within which a network of connected things (lamps) relying on the LoRa ® specification is deployed to manage the lighting system: this person theoretically has the capacity to control the lighting system of said residence as he or she pleases, if the connected things are situated within the control range of the controller of this person. In this context, the service zone corresponding to the range of the signals emitted by the connected things can't be summarized as an isotropic space: the controlled management of the range of the signals emitted by such things must rely on a prioritized direction of the space used by the things and their controller. Such information can be exchanged when a connected thing is first commissioned.

These security failings were recently revealed in a trial with a drone positioned in proximity to buildings equipped with connected lamps. Instructions were transmitted by the drone to the lamps such as: "switch off all the lamps of a floor, switch off some of the lamp, etc." An attack of this type, conducted in 2016, was the subject of articles including that which can be accessed at the address https:// www.engadget.com/206/11/03/hackers-hijack-a-philips-hue-lights-with-a-drone/. The event was reported by the New York Times in the article posted online on 3 Nov. 2016, and accessible at the address http://www.nytimes.com/2016/11/03/technology/why-light-bulbs-may-be-the-next-hacker-target.html?_r=0. The products targeted in this attack are "Hue light" lamps controlled via a wireless communication of Zigbee type. The attack made it possible to show that, by using a drone situated in proximity to one of the lamps, it had been possible to spread a contaminating virus in the network of lamps and thus control the switching on and the switching off of the lamps from a device embedded on the drone.

Such an attack targeted lamps, but other things can be targeted. Many articles, such as the article "*The Internet of Things Is Wildly Insecure—And Often Unpatchable*", accessible at the address https://www.schneier.com/essays/archives/2014/01/the_internet_of_thin.html and the article accessible at the address https://events.ccc.de/congress/2014/Fahrplan/events/6166.html also report on the failure of the solutions considered which rely on more robust security mechanisms or on software embedded in the connected thing that can be regularly updated to resolve a security failing. However, it has been reported that the updating process can malfunction and that the current technologies do not support the functions required for these solutions, or do so poorly. It should be noted that some implementations use "simplified/simplistic" security models which make attacks possible. For example, the article "*Hacking into Internet Connected Light Bulbs*" that can be accessed at the address https://www.contextis.com/resources/blog/hacking-internet-connected-light-bulbs/>> explains how the choice of one and the same security key with an AES (Advanced Encryption Standard) encryption algorithm can severely penalize the operation of a network of connected things.

SUMMARY OF THE INVENTION

The subject of the invention is a method for controlling a radio signal emitted by a device to adapt its range. The method comprises:
  determination by a controller of a level of radio signal emitted by the device at the limit of a determined zone,
  commanding by the controller of an adaptation of the range of the radio signal emitted by the device according to the comparison of the signal level and of a determined threshold.

The zone is by default the zone covered by the device. This device is for example a gateway and this gateway has the controller embedded in it. Each gateway, residential or not, can register input from a user. In particular, the residential gateway registers a data describing the environment of the user of this gateway. The data describing the environment can consist of information on the dimension of the environment of the user. For example, it relates to a distance between the residential gateway and the external walls of the residence of the user. This distance delimits a volume considered as the environment of the user which determines the zone.

Thus, knowing the zone, the gateway can automatically adjust its range to the limit of this zone. In effect, knowing its emitted power and a propagation model, the gateway can determine the power at the limit of the zone. The gateway can then adjust the emitted power for the power at the limit of the zone to be below a minimum reception threshold admissible by a terminal which wants to be associated with the gateway.

Thus, even if an electronic device, for example a drone, can approach the limit of the zone, the residence for example, it can not be associated with the gateway given that radiated signal at this limit is below a signal level necessary to establish a connection.

The device can be a thing connected to a local area network and controlled by a controller. A gateway can have the controller of the device embedded in it or be connected to such a controller embedded in an electronic device such as a smartphone. The radiation zone of the thing can then correspond to the determined zone, to a sub-zone of the determined zone or to a different zone. The zone of service of the connected thing can be defined independently of the service zone of a gateway. The method can be activated by a connecting thing with or without the presence of a gateway in the user environment.

Another subject of the invention is a residential gateway intended to be connected to a communication network. The gateway comprises:
  means for emitting and receiving a radio signal,
  a memory for memorizing data describing the residential environment of a user of the gateway defining a zone,
  a processing unit for determining the signal level at the limit of the zone and for comparing this level to a threshold, the processing unit being programmed to command the adaptation of the range of the radio signal emitted by the gateway if the threshold is exceeded.

Another subject of the invention is a communication system comprising a residential gateway for controlling a radio signal emitted by the gateway. The system is such that the gateway is in accordance with a preceding subject.

The proposed method thus provides a robust solution for limiting attacks on a connected thing (or a set of connected things) without making any assumption as to the robustness of the security mechanism supported or as to the software maintenance cycle, by controlling the range of the communications of such a connected thing.

According to an embodiment of the invention, the zone is determined by receiving and using location information transmitted by a mobile terminal moved between points at the limit of the zone to be delimited.

According to an embodiment of the invention, a residential gateway has the controller embedded in it.

According to an embodiment of the invention, the method further comprises:
  registration by the gateway of data describing an environment of a user of this gateway to determine the limits of the zone.

According to an embodiment of the invention, the method further comprises:
  sending of a request for its location to any terminal seeking to be associated with the gateway,
  authorization of the association of the terminal with the gateway only if it is located within the zone.

According to an embodiment of the invention, the method further comprises:
  reception of an association request originating from a terminal comprising the location of this terminal,
  authorization of the association of the terminal with the gateway only if it is located within the zone.

According to an embodiment of the invention, the method further comprises:
  registration by the residential gateway of preferences of a user on his or her environment.

Each gateway, residential in particular, can register preferences of the user as to his or her environment. The function of the preferences on the environment is to specify radiation modalities of the residential gateway. Thus, the user can for example define a time band of radiation or of non-radiation of his or her residential gateway and a time of validity of these preferences (period excluding weekend). The preferences have default values. By default, they can authorize the adaptation of the range (power, frequency, antenna gain, etc.).

According to an embodiment of the invention, the device is a connected thing. The method further comprises:
provision by the controller to the thing of information on its location,
rejection by the thing of any request or command coming from the controller if the latter is located outside of the determined zone.

According to an embodiment of the invention, the device has the controller embedded in it.

According to an embodiment of the invention, the comparison to a threshold is repeated.

The repeating of the comparison at more or less regular instants allows for an adaptation to changes in the environment, for example the moving of a piece of furniture which has the effect of increasing or reducing the attenuation of the emitted signal and therefore of modifying the range.

A residential gateway according to the invention is particularly well suited to implementing the method as described previously. Thus, such a gateway can have different features relating to the method according to the invention, these features being able to be combined or taken in isolation.

Another subject of the invention is one or more computer programs comprising instructions for implementing at least one method as described above when this program or these programs are run by a processor.

Another subject of the invention is one or more information media, non-removable, or partially or totally removable, that can be read by a computer, and comprising instructions of one or more computer programs for executing the steps of at least one method as described above.

The method according to the invention can therefore be implemented in various ways, particularly in hardwired form and/or in software form.

LIST OF FIGURES

Other features and advantages of the invention will emerge more clearly on reading the following description of particular embodiments given as simple illustrative and nonlimiting examples and the attached drawings, in which.

DESCRIPTION OF EMBODIMENTS OF THE INVENTION

The general principle of the invention relies on the adaptation of the range of the signal emitted by a device, in particular a gateway or a connected thing, to reduce the risk of fraudulent use by a third-party device. A third-party device can be a drone which approaches at a distance from or as close as possible to the residential environment. The optimizing of the coverage to the residential environment of the user of the gateway already makes it possible to reduce the above risk. The coverage can of course be limited to a zone which is not identical to the residence, but more restricted or more expansive. For example, this zone can be limited to a room or extended to several rooms of several apartments.

Reducing the range of the radiation amounts to reducing the signal level that can be detected in this residential environment. The zone covered can be restricted, extended, even focused, and therefore the range can be adapted by modifying, for example, the transmitted power, the transmission frequency or, for example, by effecting beamforming or spatial coding. The coverage zone can thus be controlled using a plurality of unidirectional antennas. It can of course be implemented a combination of these means to adapt the zone covered and therefore the range.

Thus, the control of the emitted signal makes it possible to adapt the range of this signal and therefore the zone covered to cover a so-called optimal service zone. Reducing the range can thus make it possible for the radiated energy to no longer be sufficient for a device such as a drone to be able to detect the signal and fraudulently connect to a remote network via the gateway or simply be introduced into a local area network accessible via the gateway.

The residential gateway can also take into account preferences of radiation on its environment as expressed by its user to adapt the range of its emitted signal. The radiation zone can become nil by cutting the emission of the signal, for example at night.

The invention is described in more detail in the context of a Wi-Fi gateway, that is to say one emitting a signal conforming to at least one of the standards from the IEEE802.11 family.

Figure 1:
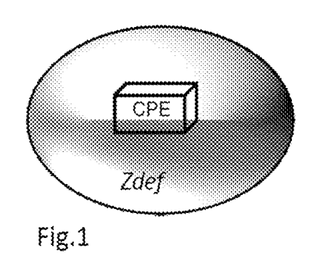
FIG. 1 is a diagram illustrating the radiation zone or service zone of a Wi-Fi gateway.

FIG. 1 schematically illustrates the service zone Zdef or zone covered by a gateway which defines the range of this gateway. It is well understood that, in reality, the coverage or range does not follow a perfect geometrical form as represented in the figure but has an irregular profile which depends on the environment: walls, floors, nature of the walls and of the floors, distance to the walls, etc.

Figure 2:
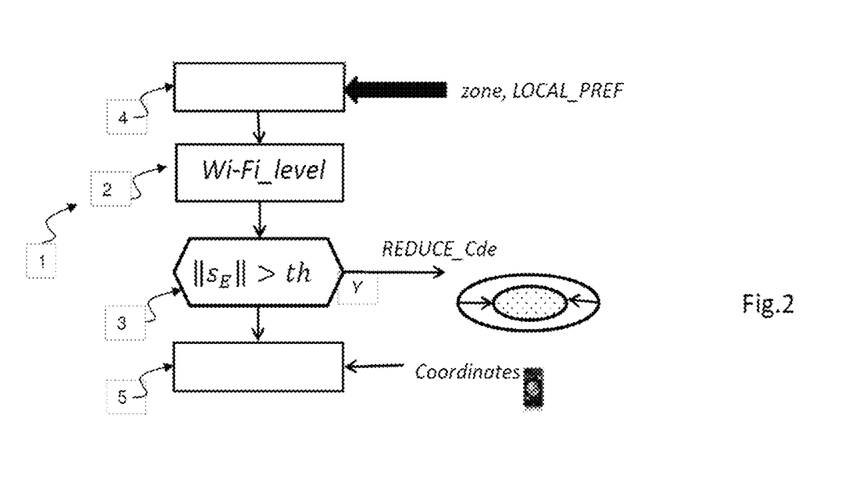
FIG. 2 is a flow diagram of the main steps of a method according to the invention.
Figure 3A:
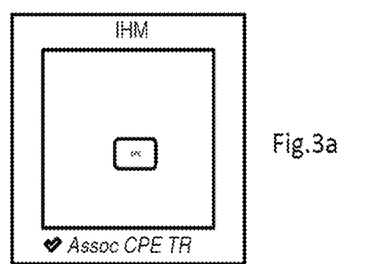
FIGS. 3a-3d represent diagrams illustrating an embodiment according to which the retrieval of location coordinates of a tracer associated with the gateway makes it possible to delimit the zone.
Figure 3B:
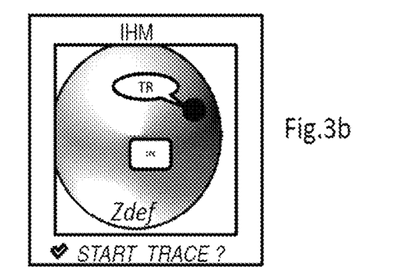
Figure 3C:
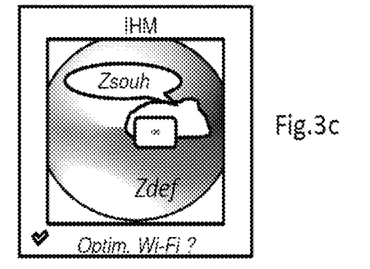
Figure 3D:
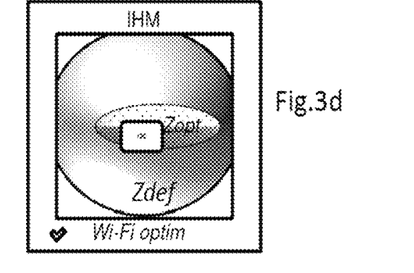

The main steps of the invention are illustrated by the flow diagram of FIG. 2. The description below considers that the device and the gateway are one and the same unless indicated otherwise.

The method 1 controls the radio signal emitted by a gateway CPE to adapt its range. It is of course understood that a gateway can emit several different radio signals which can also be simultaneous depending on the capabilities of the gateway. For example, the gateway can emit a signal of Wi-Fi type simultaneously with a signal of Bluetooth or Zigbee type. The method can be deployed to control several signals emitted by the same gateway.

The method 1 comprises the determination 2 by the gateway of a level Wi-Fi_level of radio signal emitted at the limit of a determined zone. As indicated previously, according to an embodiment, the signal is that emitted by the gateway. According to another embodiment, the gateway controls the signal emitted by a distinct device. The function of determination of the range of a local radio interface and the function of controlling an interface embedded in a third-party device can be co-located or embedded in different devices.

According to an embodiment, the gateway displays a zone, which is, by default, the Wi-Fi coverage zone. Generally, a human-machine interface (IHM) can allow the user to input data descriptive of the environment which define the zone to be taken into account. According to another embodiment, the descriptive data are retrieved via a communication with a tracer moved at the limit of the zone to be covered. Other management interfaces can be used, such as a display screen on the front panel of a gateway or a pair of smart glasses associated with the residential gateway. The gateway can be connected to one or more devices having a human-machine interface and/or a graphical interface such as a television screen, a PC, a tablet, a smartphone on which the zone can possibly be displayed and by means of which the user can perform the inputting via a remote control, a keyboard, etc.

Knowing the zone, its emitted power and a propagation model, the gateway determines the emitted power level at a distance which corresponds to the limit of the zone.

The method 1 further comprises the comparison 3 of the emitted signal at the zone limit to a determined threshold: $\|s_E\| > th$. And if Y the emitted signal $S_E$ exceeds the threshold th then the gateway CPE commands REDUCE_Cde an adaptation of the range of the emitted radio signal.

The value of the threshold can be, by default, the minimum detection threshold set for example in one of the IEEE 802.11 standards.

The method 1 can further comprise the registration 4 by the gateway CPE of data zone descriptive of an environment of a user of this gateway.

According to an embodiment, the user can input data describing the residence. The user can be plural; it is not necessarily the same physical person who uses the gateway and who inputs the description data. The data describing the environment make it possible to determine the outlines of the environment of the user to be considered. The data can comprise a type of residence (house, apartment), a number of rooms to be considered, an overall floor area to be considered, a number of floors to be considered, a number of rooms per floor to be considered, the location of the gateway in the residence, etc. The limit of the zone is identified at the outlines of the environment.

According to another embodiment illustrated by FIGS. 3a-3d, the gateway can propose to the user, via a management interface IHM, a mode which relies on the retrieval of location coordinates of a mobile terminal or tracer TR associated with the gateway CPE. This tracer can be a Wi-Fi client embedded in an existing terminal (smartphone, portable PC) or transported by a drone, or can be a dedicated device which is associated with the gateway CPE solely for Wi-Fi calibration purposes. According to this embodiment, once the association Assoc CPE TR is established between the gateway CPE and the tracer, the user is prompted START TRACE? to move or have the tracer moved to delimit the outlines of the environment and thus define the data zone. Thus, the tracer regularly transmits its new location coordinates, for example GPS (Global Positioning System) (or coordinates for which the location of the gateway is the reference) which allow the gateway CPE to determine the outlines of the environment and therefore the limit of the desired service zone Zsouh. Knowing its location, for example its own location coordinates, the gateway can position the zone relative to its own location. Once the tracing phase is finished, the gateway CPE prompts Optim. Wi-Fi? the user to activate the Wi-Fi coverage zone optimization procedure. Once this modification is finished, Wi-Fi optim, the gateway can display the new service zone Zopt.

If the gateway is moved, the change of its location automatically makes it possible to move the zone. However, the user can be prompted to run a new step of registration by the gateway CPE of data zone descriptive of the new environment. This step of interaction with the user is not necessary if the gateway has an accelerometer embedded in it, the aim of which is to adjust the new location of the gateway to keep the radiation of the radio interfaces to the service zone defined previously by the user.

Figure 4:
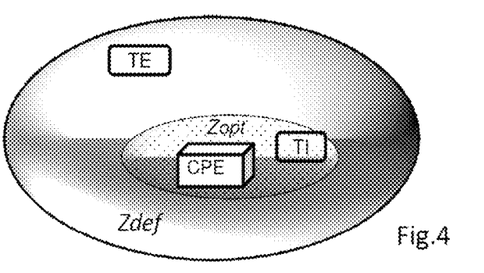
FIG. 4 is a diagram illustrating the default radiation zone of a Wi-Fi gateway and the zone after optimization, i.e., the adaptation of its range and the positioning of two terminals of which one, TI (internal terminal), is within the optimized zone, and the other, TE (external terminal), is outside of the optimized zone.

By virtue of the activation of the method according to the invention, a client optimizes the range of the Wi-Fi signal of his or her gateway CPE as illustrated by FIG. 4. He or she thus in particular has the possibility of limiting the access to the services offered by or via his or her gateway CPE to only the terminals TI present within the service zone and duly authorized to benefit from the services provided by or via the gateway. The terminals TE external to the service zone are no longer able to initialize radio attachment attempts with the gateway CPE.

The tracer can be used to check whether the new service zone (that is to say after optimization) conforms to the service zone as entered by a user.

An additional or alternative precaution for limiting the access to the services offered by or via the gateway CPE to only the terminals located within a determined zone consists in requiring the geographic coordinates of the terminal upon its attachment to the network managed by the gateway. This procedure can even be deployed if the gateway CPE has data describing the zone but does not have a mechanism for limiting the range of the radio signal to this zone. The method 1 can thus prohibit 5 any association or connection authorization subject to receiving the location of the terminal and this location being included within the zone.

Figure 5:
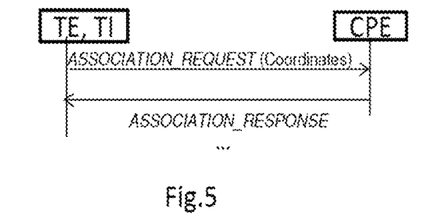
FIGS. 5 and 6 are diagrams of protocol interchanges according to embodiments of the invention according to which the method requires the geographic coordinates of the terminal upon its attachment to the network or the geographic coordinates of the controller upon its association with a connected thing.
Figure 6:
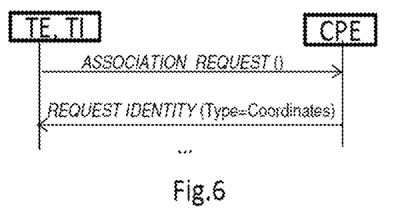

As illustrated by FIG. 5, the geographic coordinates can be supplied by the terminal TE, TI in the association request message ASSOCIATION REQUEST(Coordinates) or on explicit request from the gateway CPE as illustrated by FIG. 6. If the gateway CPE does not receive the coordinates of the terminal in the association request message ASSOCIATION REQUEST(), the gateway explicitly invokes the terminal for it to supply its coordinates to it. To this end, an identity request REQUEST IDENTITY(Type=Coordinates) is sent to the terminal with a code specifying that it must supply the coordinates in addition to the usual identity control information.

On reception of the coordinates coming from the terminal, the gateway CPE checks whether the terminal is situated within or outside of the service zone configured by default or configured by the user. Thus, the access to the services offered or via the gateway CPE is authorized following this check only to the terminals situated within the service zone. This measure reinforces the control ensured by the method 1 according to the invention.

The method 1 can further comprise the registration 4 by the residential gateway CPE of preferences LOCAL_PREF of a user of this gateway CPE on his or her environment. The function of the preferences on the environment is to specify the radiation modalities of the residential gateway.

The preferences LOCAL_PREF of a user of the residential gateway relate to his or her preferences regarding the activation or the deactivation of the Wi-Fi interface of his or her own residential gateway. Thus, LOCAL_PREF relates to the activation bands of the Wi-Fi interface of his or her gateway CPE.

Figure 7:
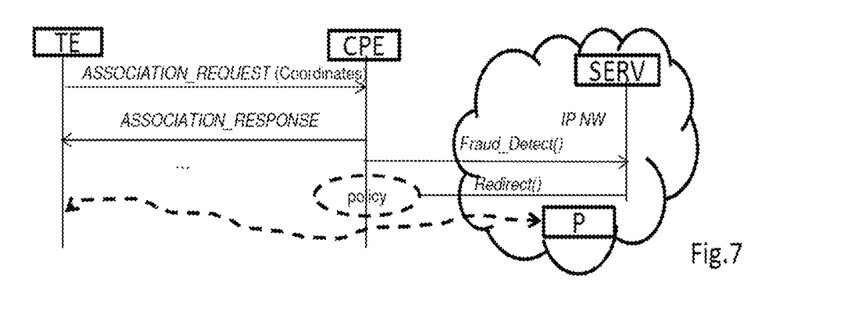
FIG. 7 is a diagram illustrating an embodiment of the method according to which streams from terminals are redirected to a server by application of rules (policy)

According to an embodiment, the connections originating from a terminal situated outside of a service zone are relayed by the gateway CPE to a dedicated server of the operator of a communication network to which the gateway accesses as illustrated by FIG. 7. This server is responsible for fraud detection and for the collection of information which make it possible to identify a malicious user (collection of MAC addresses, simulation of a successful attempt to access the network, etc.). Referring to the example illustrated by FIG. 7, the gateway CPE redirects the connections received by a terminal TE to a server SERV of the operator using filters which are activated in the gateway CPE. The traffic from the external terminal TE is then sent to a dedicated platform P of the operator for more advanced processing such as, for example, the collection of useful data to identify the user TE, the backing up of a trace of the fraudulent connection attempts, etc. Given that the redirection to a platform of the operator can consume a lot of resources of the gateway CPE, this procedure can be activated/deactivated on demand, for a portion of the traffic, or according to other criteria specific to the gateway CPE or instructed by the operator.

In the case of a network of connected things (providing a service relying on the Internet of things or IoT, a controller for managing these things is used to make a service (management of the lighting system, management of the heating system, management of the smoke or motion detectors, etc.) accessible within the service zone. This controller can be embedded in the gateway or in another electronic device. The gateway with an actuator or controller function embedded is capable of generating commands intended to modify the range of the things connected within a network to which the gateway is also connected. In effect, the very great majority of the connected things have a microcontroller MCU (or Micro Controller Unit) and a regulator LDO (Low Dropout Voltage) embedded. The microcontroller MCU makes it possible in particular to manage the transmission power of the radio components but also the energy consumed. For example, it is possible to define a "duty cycle" which makes it possible to optimize the energy consumption of the thing through the definition and the configuration of the states, TX (Transmit), RX (Receive), idle (standby) or sleep. The regulator LDO can be parameterized to make it possible to optimize the life of the batteries (for example when the batteries are AA or AAA batteries) embedded in the thing by acting in particular on the power of the emitted signal. The deployment of such connected things was done first of all in an industrial context (networks of sensors on a production site) then in a metropolitan context (management of the light system of the Olympic sites in Beijing in 2008, for example) and then, little by little, in a domestic context. The range of the waves generated by the connected things is thus calibrated by the controller according to the coverage zone of the service or services provided by the things. If the controller is embedded in a gateway, the zones covered by these things can constitute a subzone of the service zone calibrated by the gateway. Each thing is therefore a device for which the method can adapt the emitted signal.

This subzone is for example delimited by the location of the sensors according to the outfitting of the residence and the nature of the service that they provide. However, the security risks linked to the deployment of a network of connected things requires the service zone not to be an isotropic space: in effect, a direction within the space corresponding to the service zone must always be prioritized to ensure that only the controller of the user is duly authorized to send commands to all of the connected things placed under its operational responsibility.

This precaution makes it possible in particular to minimize the risks of attacks linked to the presence of (external) devices likely to generate commands to the connected things when these devices are located in proximity (for example, a drone situated in proximity to the residence of the user) or are even located in the service zone delimited by the gateway (for example, because of the presence of a visitor having a smartphone with the controller function embedded).

The calibration relies on the sending by the controller of a first message SET_DIRECTION() intended to inform the connected things of the direction prioritized in the space within the service zone (North, North-East, East, South, South-West, etc.) to communicate with the controller by virtue of the location of the connected thing. Then, the calibration of the range of the signals emitted by the connected things relies on the sending of a message SET_RANGE() by the controller.

A variant consists in including in the control messages the geographic coordinates of the controller. The transmission of these coordinates allows the connected thing to check whether the controller is situated within the service zone or outside given that the thing knows the service zone. The primitives used to communicate these coordinates are similar to those already described for the case of the gateway CPE. In the case where the controller is located outside of the determined service zone, the connected thing can reject any request or command from the controller and thus avoid fraudulent use.

Figure 8:
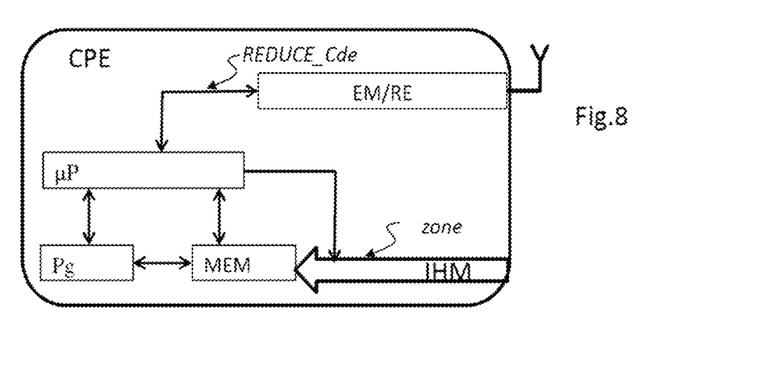
FIG. 8 is a diagram of the simplified structure of a residential gateway according to the invention suitable for implementing a control method according to the invention.

FIG. 8 illustrates the simplified structure of a residential gateway CPE implementing a control method according to one of the embodiments described above.

The gateway CPE according to an embodiment of the invention comprises a memory MEM comprising, for example, a buffer memory (RAM), emission and reception means EM/RE for emitting and receiving a radio signal and a processing unit μP equipped for example with a microprocessor and driven by a computer program Pg implementing the control method.

On initialization, the code instructions of the computer program Pg are for example loaded into the buffer memory before being executed by the microprocessor of the processing unit μP (calculator). The microprocessor of the processing unit μR implements the steps of the control method according to the instructions of the computer program Pg to execute, by the processing unit μP, the determination of a level of radio signal emitted by the gateway CPE at the limit of a determined zone and the command to adapt REDUCE_Cde the range of the radio signal emitted by the gateway according to the comparison of the signal level and of a determined threshold.

To this end, the gateway is such that the emission means EM/RE are suitable for adapting the emitted signal according to the adaptation command REDUCE_Cde. The gateway can further comprise an interface IHM for the user to input the data Zone describing his or her residential environment and a memory space for saving this information.

These means are driven by the microprocessor of the processing unit µP.

The examples cited in the description of embodiments essentially cover the case of reducing the range of a radio signal, but the method can be applied for cases of use which require the range of a signal to be increased.

The invention claimed is:

1. A method for controlling a radio signal emitted by a device to adapt a range of the radio signal, wherein the method comprises:
registration by a residential gateway of data descriptive of an environment of a user of this gateway to determine a limit of a zone wherein the registration takes place via a graphical interface which makes it possible to display the zone,
determining, by a controller embedded in the residential gateway, a level of radio signal emitted by the device at the limit of the determined zone, and
commanding, by the controller, an adaptation of the range of the radio signal emitted by the device according to a comparison of the signal level and of a determined threshold.

2. A method for controlling a radio signal emitted by a device to adapt a range of the radio signal, wherein the method comprises:
determining, by a controller embedded in a residential gateway, a level of radio signal emitted by the device at a limit of a determined zone,
commanding, by the controller, an adaptation of the range of the radio signal emitted by the device according to a comparison of the signal level and of a determined threshold,
sending a request to any terminal seeking to be associated with the gateway for location of the terminal, and
authorization of the association of the terminal with the gateway only if the terminal is located within the zone.

3. The method for controlling a radio signal as claimed in claim 2, further comprising:
registration by the residential gateway of data descriptive of an environment of a user of this gateway to determine the limits of the zone.

4. The method for controlling a radio signal as claimed in claim 2, further comprising:
registration by the residential gateway of preferences of a user on his or her environment.

5. A method for controlling a radio signal emitted by a device to adapt a range of the radio signal, wherein the method comprises:
determining, by a controller embedded in a residential gateway, a level of radio signal emitted by the device at a limit of a determined zone,
commanding, by the controller, an adaptation of the range of the radio signal emitted by the device according to a comparison of the signal level and of a determined threshold,
reception of an association request originating from a terminal comprising a location of this terminal, and
authorization of the association of the terminal with the gateway only if the terminal is located within the zone.

6. The method for controlling a radio signal as claimed in claim 5, further comprising:
registration by the residential gateway of data descriptive of an environment of a user of this gateway to determine the limits of the zone.

7. The method for controlling a radio signal as claimed in claim 5, further comprising:
registration by the residential gateway of preferences of a user on his or her environment.

8. A method for controlling a radio signal emitted by a device to adapt a range of the radio signal, wherein the method comprises:
determining, by a controller embedded in a residential gateway, a level of radio signal emitted by the device at a limit of a determined zone,
commanding, by the controller, an adaptation of the range of the radio signal emitted by the device according to a comparison of the signal level and of a determined threshold, wherein the gateway relays a connection request from a terminal located outside of the zone to a server of a network to which the gateway accesses for the server to assess whether there is a fraud, and, in case of a fraudulent request, the method comprises a redirection of the traffic from the terminal to a dedicated service platform.

9. A method for controlling a radio signal emitted by a connected thing to adapt a range of the radio signal, wherein the method comprises:
determinating, by a controller, a level of radio signal emitted by the connected thing at a limit of a determined zone,
commanding, by the controller, an adaptation of the range of the radio signal emitted by the connected thing according to a comparison of the signal level and of a determined threshold, obtaining information, by the thing on the controller's location,
rejection by the thing of any request or command coming from the controller if the controller is located outside of the determined zone.

10. A method for controlling a radio signal emitted by a device to adapt a range of the radio signal, wherein the method comprises:
determination, by a controller, of a level of radio signal emitted by the device at a limit of a determined zone, and
commanding, by the controller, an adaptation of the range of the radio signal emitted by the device according to a comparison of the signal level and of a determined threshold, wherein the comparison to a threshold is repeated.

11. The method for controlling a radio signal as claimed in claim 10, wherein the device has the controller embedded in it.

12. A gateway connectable to a communication network, the gateway comprising:
a processing unit; and
at least one non-transitory computer-readable medium comprising instructions stored thereon, which when executed by the processing unit configure the gateway to perform acts comprising:
emitting and receiving a radio signal,
memorizing data describing a residential environment of a user of the gateway, defining a zone,
determining a signal level at a limit of the zone and comparing this level to a threshold, and
commanding adaptation of a range of the radio signal emitted by the gateway if the threshold is exceeded.

13. A communication system comprising the residential gateway according to claim 12, an interface for registration of data describing the residential environment of the user and an interface for displaying the zone.

14. A non-transitory computer-readable medium comprising instructions stored thereon, which when executed by a processor of a controller, configure the controller to perform acts comprising:
controlling a radio signal emitted by a device to adapt a range of the radio signal, wherein controlling comprises:
determining a level of the radio signal emitted by the device at a limit of a determined zone, and
commanding an adaptation of the range of the radio signal emitted by the device according to a comparison of the signal level and of a determined threshold, wherein the comparison to a threshold is repeated.

* * * * *